(12) United States Patent
Li

(10) Patent No.: US 10,690,990 B2
(45) Date of Patent: Jun. 23, 2020

(54) DISPLAY DEVICE AND DISPLAY METHOD

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 62 days.

(21) Appl. No.: 15/537,575

(22) PCT Filed: Sep. 26, 2016

(86) PCT No.: PCT/CN2016/100149
§ 371 (c)(1),
(2) Date: Jun. 19, 2017

(87) PCT Pub. No.: WO2017/181590
PCT Pub. Date: Oct. 26, 2017

(65) Prior Publication Data
US 2018/0203324 A1  Jul. 19, 2018

(30) Foreign Application Priority Data

Apr. 19, 2016 (CN) .......................... 2016 1 0245461

(51) Int. Cl.
*G02F 1/29* (2006.01)
*G02B 27/01* (2006.01)
(Continued)

(52) U.S. Cl.
CPC .......... *G02F 1/29* (2013.01); *G02B 27/0093* (2013.01); *G02B 27/017* (2013.01);
(Continued)

(58) Field of Classification Search
CPC ................ G02F 1/29; G02F 1/134309; G02F 1/133528; G02B 27/017
See application file for complete search history.

(56) References Cited

U.S. PATENT DOCUMENTS 5,798,864 A * 8/1998 Sekiguchi .............. G02B 27/42
349/17
5,973,727 A * 10/1999 McGrew .............. G02B 27/017
345/5

(Continued)

FOREIGN PATENT DOCUMENTS

CN  101794021 A  8/2010
CN  202018539 U  10/2011
(Continued)

OTHER PUBLICATIONS

International Search Report dated Jan. 13, 2017.
(Continued)

*Primary Examiner* — Dung T Nguyen
(74) *Attorney, Agent, or Firm* — Dilworth & Barrese, LLP.; Michael J. Musella, Esq.

(57) ABSTRACT

A display device and a display method are provided. The display device includes a display assembly and a refractive component. The display assembly includes a display region and is configured to emit imaging light from the display region to default direction. The refractive component is disposed on a display side of the display assembly and configured to diverge or converge at least partial imaging light. The comfort degree of the head mounted virtual reality device is improved, or a head-mounted display device with anti peeping function is provided.

10 Claims, 5 Drawing Sheets

(51) Int. Cl.
   G02F 1/1335 (2006.01)
   G02F 1/1347 (2006.01)
   G02B 27/00 (2006.01)
   *G09G 3/36* (2006.01)
   *G09G 3/00* (2006.01)
   *G02F 1/1343* (2006.01)
   *G02C 7/08* (2006.01)

(52) U.S. Cl.
   CPC .... G02F 1/13471 (2013.01); G02F 1/133528 (2013.01); *G02B 2027/0138* (2013.01); *G02B 2027/0181* (2013.01); *G02C 7/081* (2013.01); *G02C 7/083* (2013.01); *G02F 1/134309* (2013.01); *G02F 2001/294* (2013.01); *G09G 3/001* (2013.01); *G09G 3/36* (2013.01); *G09G 2300/0469* (2013.01); *G09G 2320/08* (2013.01); *G09G 2354/00* (2013.01)

(56) References Cited

U.S. PATENT DOCUMENTS

| | | | |
|---|---|---|---|
| 6,634,755 B1* | 10/2003 | Okuyama | G02B 27/145 349/5 |
| 2009/0213470 A1* | 8/2009 | Abe | G02B 17/0804 359/649 |
| 2010/0053121 A1* | 3/2010 | Sprague | G02B 27/0172 345/204 |
| 2010/0195190 A1 | 8/2010 | Ishioka et al. | |
| 2014/0118818 A1* | 5/2014 | Nishina | G02B 17/08 359/364 |
| 2014/0118838 A1* | 5/2014 | Hsu | G02B 13/18 359/649 |
| 2018/0173088 A1* | 6/2018 | Minefuji | G02B 13/18 |
| 2019/0278081 A1* | 9/2019 | Kuo | G02B 3/0037 |

FOREIGN PATENT DOCUMENTS

| | | |
|---|---|---|
| CN | 102279491 A | 12/2011 |
| CN | 103605199 A | 2/2014 |
| CN | 104808342 A | 7/2015 |
| CN | 104865744 A | 8/2015 |
| CN | 104965382 A | 10/2015 |
| CN | 105068648 A | 11/2015 |
| CN | 15702171 A | 6/2016 |
| CN | 105759424 A | 7/2016 |
| CN | 205751379 U | 11/2016 |
| KR | 20160038876 A | 4/2016 |
| WO | 2011075834 A1 | 6/2011 |

OTHER PUBLICATIONS

First Office Action issued by the Chinese Patent Office in the corresponding Chinese application No. 201620331180.6 dated Jul. 29, 2016.
First Office Action issued by the Chinese Patent Office in the priority Chinese application No. 201610245461.4 dated Nov. 30, 2017.
Third Chinese Office Action dated Dec. 12, 2018.

* cited by examiner

DISPLAY DEVICE AND DISPLAY METHOD

CROSS REFERENCE TO RELATED APPLICATION

The present application claims priority to the Chinese Patent Application No. 201610245461.4 filed on Apr. 19, 2016, the entire contents of which are incorporated herein by reference as a part of the present application.

TECHNICAL FIELD

Embodiments of the present invention relate to a display device and a display method.

Virtual reality (VR) technology is to virtualize realistic scenes and generate three-dimensional (3D) virtual real-time images, and subsequently fuse the 3D virtual real-time images with other virtual images to form combined images which are then displayed to viewers through a display device. Currently, a VR headset is a relatively mature application in the VR technology. The headset is provided with headset displays corresponding to the left eye and the right eye of the user. The two headset displays can respectively display images with different visual angles, and the viewers can get immersive visual enjoyment for 3D virtual images after obtaining the images with visual difference (VDIFF).

For near-sighted or far-sighted viewers, they also need to wear corresponding myopic lenses or hyperopic lenses when they use the head-mounted VR devices, such as VR headsets, which reduces the comfort degree of the head-mounted VR device.

SUMMARY

At least one embodiment of the present disclosure provides a display device and a display method to improve the comfort degree of the head mounted virtual reality device, or provide a head-mounted display device with anti peeping function.

At least one embodiment of the present disclosure provides a display device. The display device comprises a display assembly including a display region and being configured to emit imaging light from the display region to a default direction; and a refractive component disposed on a display side of the display assembly and configured to diverge or converge at least partial imaging light.

At least one embodiment of the present disclosure also provides a display method. The method comprises emitting imaging light from a display region of a display assembly to a default direction; and diverging or converging at least partial imaging light through a refractive component, in which the refractive component is disposed on a display side of the display assembly.

BRIEF DESCRIPTION OF THE DRAWINGS

In order to demonstrate clearly technical solutions of the embodiments of the present invention, the accompanying drawings in relevant embodiments of the present disclosure will be introduced briefly. It is apparent that the drawings just relate to some embodiments of the disclosure and not intended to limit the present disclosure.

DETAILED DESCRIPTION

In order to allow objectives, technical solutions and advantages of embodiments of the present invention more clear, technical solutions according to the embodiments of the present disclosure will be described clearly and fully as below in conjunction with the accompanying drawings of embodiments of the present disclosure. It is apparent that the described embodiments are just a part but not all of the embodiments of the disclosure. Based on the described embodiments herein, an ordinary skill in the art can obtain other embodiment(s), without any creative work, which shall be within the scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right" or the like are only used to indicate relative position relationship, and when the position of the object which is described is changed, the relative position relationship may be changed accordingly.

At least one embodiment of the present invention provides a display device and a display method. Detailed description will be given below with reference to the accompanying drawings.

Figure 1:
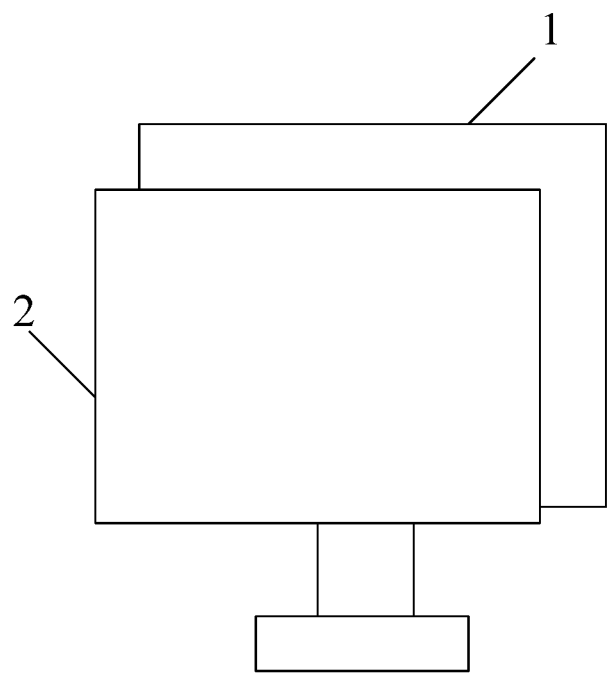
FIG. 1 is a schematic diagram of a display device provided by an embodiment of the present invention.

As shown in FIG. 1, the display device provided by at least one embodiment of the present invention comprises a display assembly 1 and a refractive component 2. The display assembly 1 includes a display region and is configured to emit imaging light from the display region to a default direction. The refractive component 2 is disposed on a display side of the display assembly 1 and configured to diverge, or converge at least partial imaging light.

The display device provided by the embodiment of the present invention may be a head-mounted display device, such as a head-mounted Virtual reality (VR) device. In this case, the refractive component may be adopted to diverge the at least partial imaging light emitted by the display assembly, so that the refractive component can correspondingly play a role of myopic lenses; and the refractive component may be adopted to converge the at least partial imaging light emitted by the display assembly, so that the refractive component can correspondingly play a role of hyperopic lenses. In this way, the near-sighted or far-sighted viewer can use the head-mounted display device without wearing corresponding myopic lenses, or hyperopic lenses, and the comfort degree of the head-mounted display device can be improved.

The display device provided by the embodiment of the present invention may also be a non-head-mounted display device. The non-head-mounted display device has an unexpected technical effect, namely peep-proof function. For instance, the near-sighted viewer can see clearly the information on the display region of the display assembly without wearing myopic lenses, but a viewer with normal vision cannot see the information on the display region of the display assembly because the vision of the viewer is unmatched with the diopter (diopter is a unit of the refractive power, represented by D) of the refractive component, so that the display device can have the function of secret protection.

For instance, the display assembly may be a liquid crystal display (LCD), an organic light-emitting diode (OLED) display, or any other product, or component with display function.

For instance, the display assembly may be a 3D display assembly for displaying 3D images. In this case, a user can see the 3D images when viewing the display device provided by an embodiment of the present invention. For instance, the 3D display assembly may include a display panel and a grating superimposed with the display panel (the grating is, for instance, disposed on a display side or a rear side of the display panel). By the mutual matching of the display panel and the grating, the 3D display assembly may emit light which only enters the left eye of a user and light which only enters the right eye of the user, so as to achieve 3D display. For instance, the grating may be a liquid crystal grating, a lenticular lens, or a parallax barrier. Moreover, the examples of the grating include but not limited to the enumerated types.

The examples of the display assembly include but not limited to the 3D display assembly. For instance, the display assembly may also be a two-dimensional (2D) display assembly for displaying 2D image. In this case, a user can see the 2D images when viewing the display device provided by the embodiment of the present invention. For instance, the display assembly may also be a 2D/3D switchable display assembly.

For instance, the refractive component 2 is configured to be able to adjust the divergence, or convergence degree of the at least partial imaging light. That is to say, the diopter of the refractive component 2 is adjustable. On one hand, due to the setting, the display device can be used by a plurality of viewers with different visions; on the other hand, due to the setting, the diopter of the refractive component can be adjusted according to the viewing sense of a same viewer.

For instance, the refractive component 2 may be a liquid crystal lens. The refractive component 2 may also adopt a gradient index (GRIN) lens. Detailed description will be given below to the refractive component by using a liquid crystal lens, in the display device provided by an embodiment of the present invention with reference to FIGS. 2a and 2b.

Figure 2A:
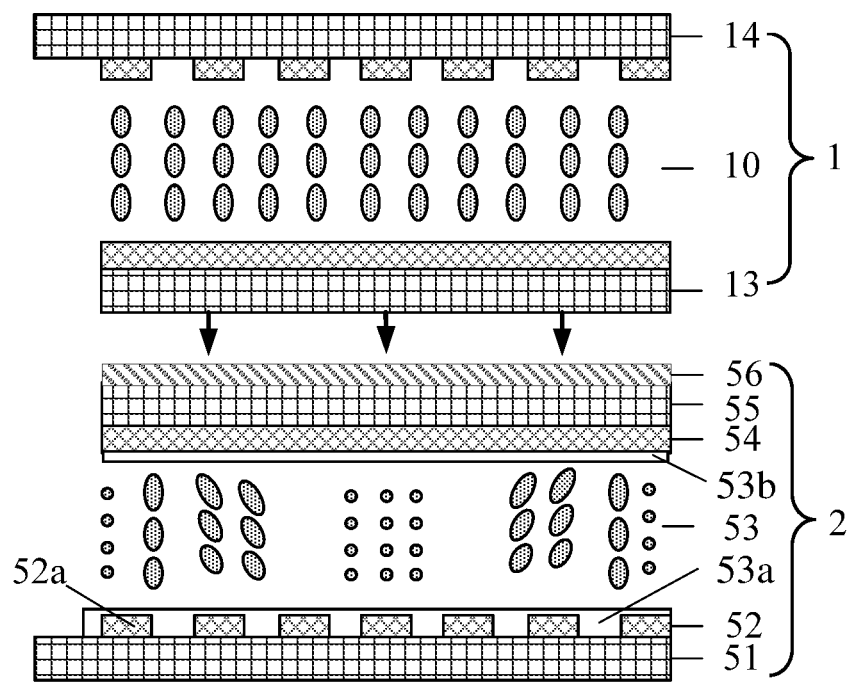
FIG. 2a is a schematic diagram of a display device provided by an embodiment of the present invention, in which a refractive component is a liquid crystal lens and a display assembly is an LCD assembly.
Figure 2B:
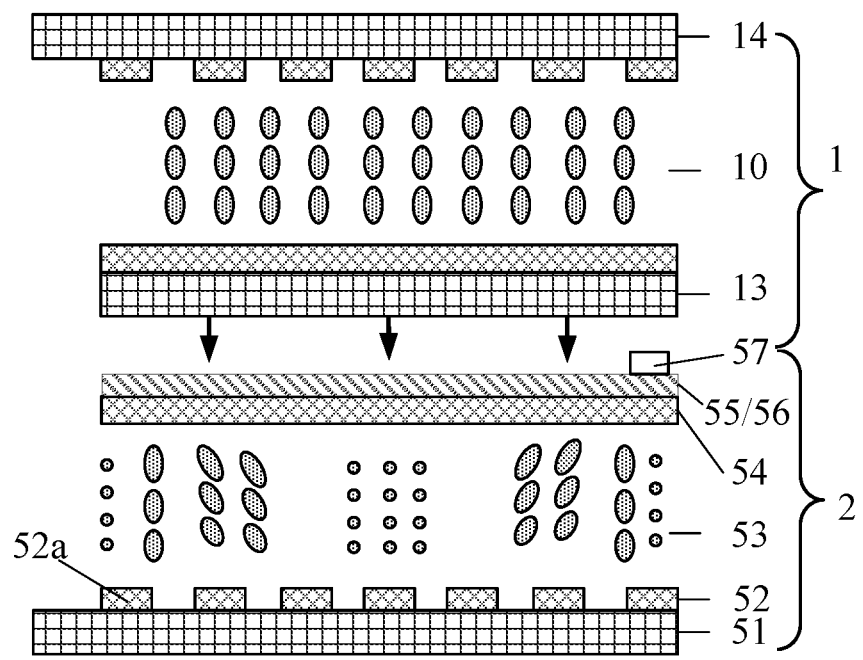
FIG. 2b is another schematic diagram of the display device provided by an embodiment of the present invention, in which the refractive component is a liquid crystal lens and the display assembly is an LCD assembly.

As shown in FIGS. 2a and 2b, when the refractive component 2 adopts the liquid crystal lens, the liquid crystal lens may include a first substrate 51 and a second substrate 55 arranged oppositely to each other, and a first electrode 52, a second electrode 54 and a liquid crystal layer 53 which are disposed between the two substrates 51 and 55. The first electrode 52 and the second electrode 54 are spaced apart from each other, and at least one of the first electrode 52, or the second electrode 54 includes a plurality of sub-electrodes spaced apart from each other. Liquid crystal molecules at different areas of the liquid crystal layer 53 can have different deflection states by applying different voltages to the plurality of sub-electrodes, so that the liquid crystal layer 53 can generate refractive index gradient. For instance, as shown in FIGS. 2a and 2b, the first electrode 52 includes a plurality of sub-electrodes 52a, spaced apart from each other, e.g., at least three sub-electrodes 52a. One of the first electrode 51 and the second electrode 54 may be a pixel electrode and the other one may be a common electrode. Arrowheads in FIGS. 2a and 2b represent the imaging light emitted by the display assembly 1.

For instance, in order to realize initial alignment to the liquid crystal molecules in the liquid crystal layer 53, the liquid crystal lens also includes alignment films 53a and 53b disposed on both sides of the liquid crystal layer 53. Surfaces of the alignment films 53a and 53b facing the liquid crystal layer 53 are roughly planar, as shown in FIG. 2a. Other structures may also be disposed in the liquid crystal lens. For instance, an insulating layer may also be disposed between the alignment films and the electrodes covered by the alignment films.

For instance, the first electrode 52 may be disposed on the first substrate 51, and the second electrode 54 may be disposed on the second substrate 55. In this case, the initial alignment of the liquid crystal molecules in the liquid crystal layer 53 is, for instance, alignment in parallel to a substrate (e.g., a glass substrate, a quartz substrate or a plastic substrate), and the alignment direction is consistent with the direction of a transmission axis of a polarizer 56. The first electrode 52 and the second electrode 54 may also be disposed on the same substrate. In this case, for instance, the initial alignment of the liquid crystal molecules in the liquid crystal layer may be vertical alignment. The liquid crystal molecules at different areas of the liquid crystal layer can have different deflection states by applying different voltages to the plurality of sub-electrodes.

For instance, when the second substrate 55 is disposed between the first substrate 51 and the display assembly 1, the liquid crystal lens can also include a polarizer 56 disposed between the second substrate 55 and the display assembly 1, as shown in FIG. 2a, namely the polarizer 56 is disposed on a side of the second substrate 55 away from the first substrate 51; Or, for instance, when the second substrate 55 is disposed between the first substrate 51 and the display assembly 1, the second substrate 55 may be a polarizer, as shown in FIG. 2b. The structure of the liquid crystal lens can be simplified by using the polarizer 56 as the second substrate (for instance, a second electrode 54 is directly formed on the polarizer).

For instance, as shown in FIGS. 2a and 2b, the liquid crystal lens and the display assembly 1 may share a polarizer 56, namely the polarization direction of the imaging light emitted by the display assembly 1 does not change its direction after transmitting through the polarizer 56 and before arriving at the liquid crystal layer 53 of the liquid crystal lens, so that the integration level of the display device provided by the embodiment of the present invention can be improved. In this case, for instance, the display assembly 1 includes a third substrate 13 (e.g., a color filter (CF) layer may be disposed on the third substrate) and a fourth substrate 14 arranged oppositely to each other, and a liquid crystal layer 10 disposed between the third substrate 13 and the fourth substrate 14. The third substrate 13 is disposed between the polarizer 56 and the fourth substrate 14. Moreover, except the polarizer 56, other polarizers are not disposed between the second substrate 55 and the third substrate 13. In this way, when the display assembly 1 is an LCD assembly, a polarizer is not required to be independently arranged for the display assembly 1.

For instance, as shown in FIG. 2b, the liquid crystal lens may also include a drive unit 57. The drive unit 57 is configured to apply different voltages to different positions of the liquid crystal lens, so as to change the diopter of the liquid crystal lens. For instance, the drive unit 57 may be a driver integrated circuit (IC), or other drive circuits.

For instance, the liquid crystal lens and the display assembly 1 may share the drive unit 57, as shown in FIG. 2b. That is to say, the drive unit 57 can provide electrical signals for the liquid crystal lens so as to achieve the function of a concave lens or a convex lens of the liquid crystal lens, and it can also provide electrical signals for the display assembly 1 so as to achieve the display function of the display assembly 1. The integration level of the display device provided by the embodiment of the present invention can be improved by sharing the drive unit 57.

When the liquid crystal lens and the display assembly 1 share the drive unit, the display assembly 1 may be an LCD assembly, an OLED display assembly, a quantum dot display assembly, or display assemblies of other types.

The examples of the liquid crystal lens in the embodiment of the present invention include but not limited to the structure as shown in FIGS. 2a and 2b. Description will be given below to the principle of realizing the concave lens and the convex lens in the liquid crystal lens by taking the case that the first electrode 52 and the second electrode 54 are respectively disposed on the first substrate 51 and the second substrate 55 as an example.

Figure 3A:
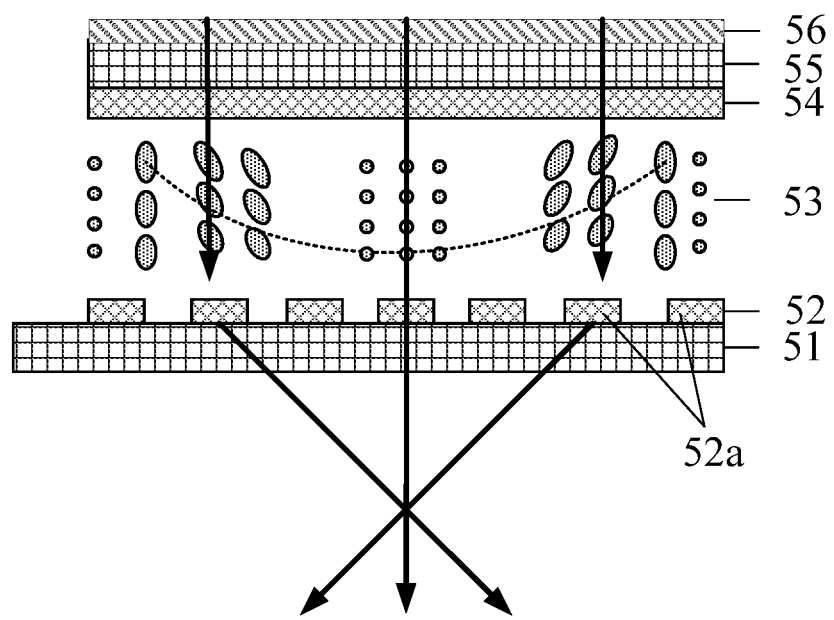
FIG. 3a is a schematic diagram illustrating the principle of realizing a convex lens when the refractive component is a liquid crystal lens, in the display device provided by an embodiment of the present invention.

As shown in FIG. 3a, when the refractive component 2 adopts the liquid crystal lens, the principle of the liquid crystal lens forming the convex lens is as follows. For instance, in order to realize the convex lens, the drive circuit 57 may apply a voltage to edge parts on both sides of the liquid crystal layer 53 through the first electrode 52 and the second electrode 54. When external light traveling through the refractive component 2, it is converted into linearly polarized light through the polarizer 56 at first, and the polarization direction of the linearly polarized light is consistent with the direction of liquid crystal directors in the center of the liquid crystal layer 53. At this point, the refractive index of the linearly polarized light running through the liquid crystal layer 53 is $n_e$, and the refractive index of a central part of the liquid crystal layer 53 is maximal. With the voltage between the first electrode 52 and the second electrode 54 being gradually increased, the electric field at the edge parts of the liquid crystal layer 53 is gradually increased, and the refractive index in the direction from the central part to the edge parts on both sides is gradually decreased. When the liquid crystal molecules in the liquid crystal layer 53 are all vertically arranged along the electric field direction, the refractive index of the linearly polarized light running through the liquid crystal layer 53 is $n_o$, and the minimum refractive index is obtained at the edge parts, so that a refractive index gradient from the central part to the edge parts can be formed. When parallel light runs through the liquid crystal layer 53 with the refractive index distribution, as the refractive index of the central part of the liquid crystal layer 53 is greater than the refractive index of the edges on both sides, the travel speed of the light in the central part of the liquid crystal layer 53 is slow, finally, the parallel light is converged to a focus after leaving the lens, then, a convex lens is formed.

Figure 3B:
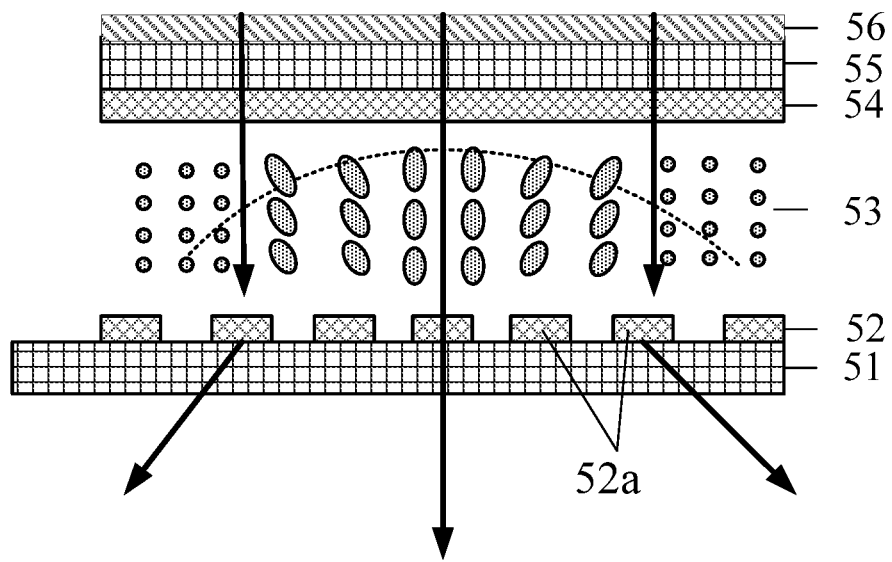
FIG. 3b is a schematic diagram illustrating the principle of realizing a concave lens when the refractive component is a liquid crystal lens, in the display device provided by an embodiment of the present invention.

When the convex lens is formed, the voltage applied to the liquid crystal molecules can change by controlling a switch of the concave lens and the convex lens, so that the deflection degree of the liquid crystal molecules can vary. That is to say, the maximum voltage is applied to the center of the liquid crystal layer 53 at the same position, and the edges of the liquid crystal layer 53 maintain the original parallel alignment arrangement without a voltage applied thereto, and opposite effects can be obtained. In other words, the refractive index of the liquid crystal 1 layer 53 is minimum in the center and greater towards the edges on both sides. In this way, the parallel light will form surface waves opposite to the convex lens after running through the liquid crystal layer 53, so that the polarized light is finally diverged, then, a concave lens is formed, as shown in FIG. 3b. In this way, the liquid crystal lens can achieve the effect of converging, or diverging light according to the variation mode of the refractive index, so as to achieve the function switching of the convex lens and the concave lens.

Description will be given below to the principle of adjusting the diopter in the liquid crystal lens by taking the convex lens as an example for convenience.

After the parallel light runs through a refractive substance, the refractive power of the refractive substance is 1D when the focal length f is 1 meter, and the focal length is shorter when the refractive power is larger, so D=1/f; and 1D is equivalent to 100 degrees, namely D=Φ/100. So the relation between the degree D and the focal length f of the lens is Φ=(1/f)×100, where the unit of the focal length f is meter. For instance, as for a myopia degree of 500 degrees, the refractive power is −5D, so the focal length f=⅕ meter. Therefore, the degree of the refractive substance may be adjusted according to the focal length of the refractive substance.

For a liquid crystal lens, the focal length $f=r^2/[(n_{max}-n_r)\cdot d]$, where r refers to the radial distance from the center to the edges on both sides; d refers to the cell gap of the liquid crystal lens; and $(n_{max}-n_r)$ refers to the difference between the refractive index of the center of the liquid crystal lens and the refractive index of the edges on both sides, and as for liquid crystals, the maximum is $(n_e-n_o)$. The cell gap d of the liquid crystal lens is a constant value, so the focal length f of the liquid crystal lens can be adjusted by a change of $(n_{max}-n_r)$ value. As the $(n_{max}-n_r)$ value can be varied by changing an included angle between the directors of the liquid crystal molecules and an optical axis after applying different voltages, the focal length f of the liquid crystal lens can be adjusted by changing the voltages.

Figure 4:
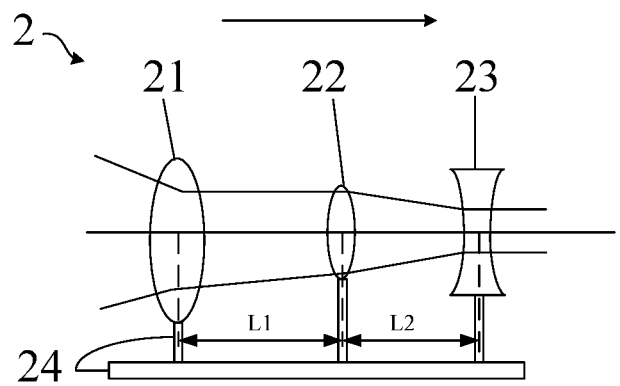
FIG. 4 is a schematic diagram of a display device provided by an embodiment of the present invention, in which the refractive component includes a plurality of independent lenses.

For instance, the refractive component 2 may also be achieved in a form of an optical lens group. For instance, as shown in FIG. 4, the refractive component 2 may include a first lens 21 and a second lens 22 which are spaced apart from each other, and an adjustment structure 24. The adjustment structure 24 is connected with the first lens 21 and the second lens 22 and configured to adjust the spacing L1 between the first lens 21 and the second lens 22. For instance, the first lens 21 and the second lens 22 are arranged sequentially along a propagation direction (for instance, as shown by arrowheads in FIG. 4; or the propagation direction of the imaging light may be opposite to the direction as shown in FIG. 4) of the imaging light of the display assembly. The diopter of the refractive component 2 can be changed by adjusting the spacing L1 between the first lens 21 and the second lens 22.

For instance, the adjustment structure 24 may adopt a combined mode of a slider and a guide rail. For instance, the adjustment structure 24 may include a guide rail and a plurality of supports capable of sliding in the guide rail. The supports respectively support the plurality of lenses in the refractive component 2. The distance between two lenses may be adjusted by controlling the distance between the supports of the adjustment structure 24, so that the divergence or convergence degree of the light can be changed. Moreover, for instance, the adjustment structure 24 may be a threaded rotary adjustment structure. The structure is, for instance, applied in a lens of the conventional camera or video camera. The refractive component 2 may be equivalent to a zoom lens. The examples of the adjustment structure 24 includes but not limited to the combined mode of the slider and the guide rail, or the threaded rotary adjustment structure.

For instance, the refractive component 2 may also include: a third lens 23 disposed on a side of the second lens 22 away from the first lens 21 and spaced apart from the first lens 21 and the second lens 22. For instance, the first lens 21, the second lens 22 and the third lens 23 may be sequentially arranged along the propagation direction of the imaging light of the display assembly. As shown in FIG. 4, the spacing between the third lens 23 and the second lens 22 is L2, and the diopter may also be changed by adjusting L2.

For instance, both the first lens 21 and the second lens 22 may be a convex lens, and the third lens 23 may be a concave lens. Other combination of the concave lens and the convex lens may also be adopted.

Figure 5:
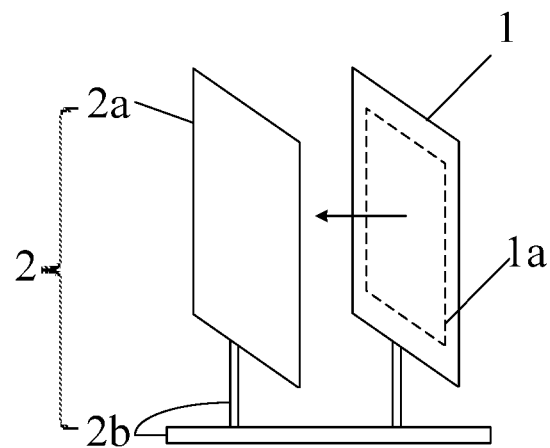
FIG. 5 is a schematic diagram of a display device with a distance adjustment structure provided by an embodiment of the present invention.

For instance, as shown in FIG. 5, in the display device provided by at least one embodiment of the present invention, the refractive component 2 may include a refractive unit 2a configured to diverge or converge at least partial imaging light (as shown by arrowheads in FIG. 5); and a distance adjustment structure 2b configured to change the distance between the refractive unit 2a and a display region 1a of the display assembly 1. The divergence or convergence degree of the imaging light emitted by the display assembly 1 running through the refractive component 2 may also be varied by changing the distance between the refractive unit 2a and the display assembly 1.

For instance, the refractive unit 2a may be a liquid crystal lens, or includes at least one concave lens and/or convex lens. For instance, the distance adjustment structure 2b may adopt the combined mode of the slider and the guide rail, or the threaded rotary adjustment structure, or other ways commonly used in the field. When the refractive unit 2a includes the first lens and the second lens, the distance adjustment structure 2b and the adjustment structure 24 may be the same component.

Figure 6:
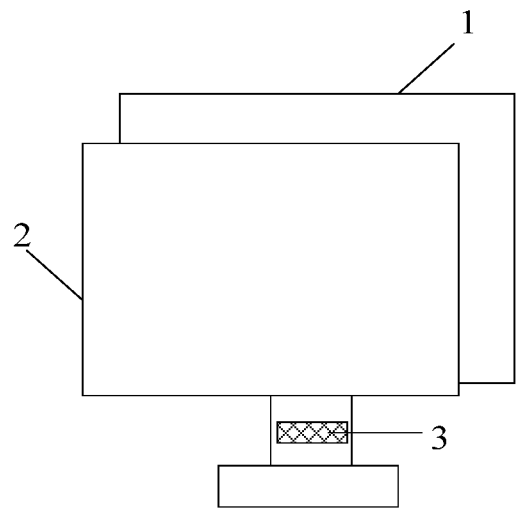
FIG. 6 is a schematic diagram of a display device with a detecting component provided by an embodiment of the present invention.

For instance, as shown in FIG. 6, the display device provided by at least one embodiment of the present invention may further include a detecting component 3 which is in signal communication with the refractive component 2. The refractive component 2 is configured to adjust the divergence, or convergence degree of the at least partial imaging light according to signals transmitted by the detecting component 3. In this way, the diopter of the refractive component 2 can be automatically adjusted, so that the convenience of diopter adjustment can be improved.

For instance, the detecting component 3 may include an eye detecting unit which is configured to acquire eye information of a user. For instance, the eye detecting unit may be an eye tracker, an eye potential detector, or the like. The examples of the eye detecting unit includes but not limited to the eye tracker, or the eye potential detector.

For instance, the detecting component 3 may also include a brain wave detecting unit which is configured to acquire brain wave information of a user. For instance, the brain wave detecting unit may be a brain wave detector. The examples of the brain wave detecting unit includes but not limited to the brain wave detector.

Description will be given below to the process of automatically adjusting the diopter of the refractive component by taking the case that the detecting component 3 is an eye detecting unit as an example.

Figure 7:
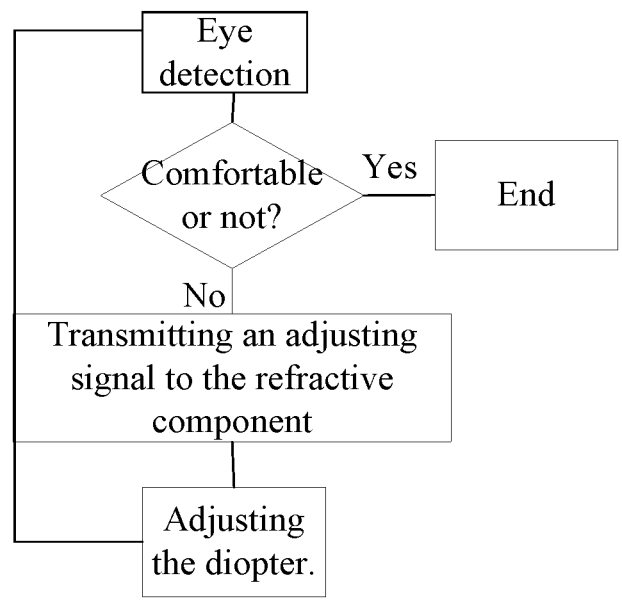
FIG. 7 is a flow chart illustrating the process of automatically adjusting the diopter by a display device according to an embodiment of the present invention.

As shown in FIG. 7, the eye detecting unit may determine whether the user is in comfortable eye state after the eye detecting is finished. If the user is determined to be in a comfortable eye state, the diopter is not required to be adjusted. If the user is determined to be not in a comfortable eye state, an adjusting signal is sent to the refractive component, then, the refractive component correspondingly adjusts the diopter of the refractive component according to the received adjusting signal. For instance, when the refractive component is a liquid crystal lens, the refractive component adjusts the voltage between the electrodes 52 and 54 (with reference to FIGS. 3a and 3b) in the refractive component according to the adjusting signal, so as to adjust the diopter. For instance, when the refractive component includes a lens group including a plurality of independent lenses, the refractive component adjusts the position of at least one lens according to the adjusting signal (for instance, L1 and the sum of L1 and L2 may be changed by adjusting the position of the first lens in FIG. 4), so as to adjust the diopter. For instance, when the refractive component includes the refractive unit and the distance adjustment structure, the refractive component may adjust the distance between the refractive unit and the display assembly through the distance adjustment structure according to the adjusting signal. When the detecting component 3 is a brain wave detecting unit, or other detecting units, the automatic adjustment process of the diopter of the refractive component 2 is similar to the process as shown in FIG. 7.

Figure 8:
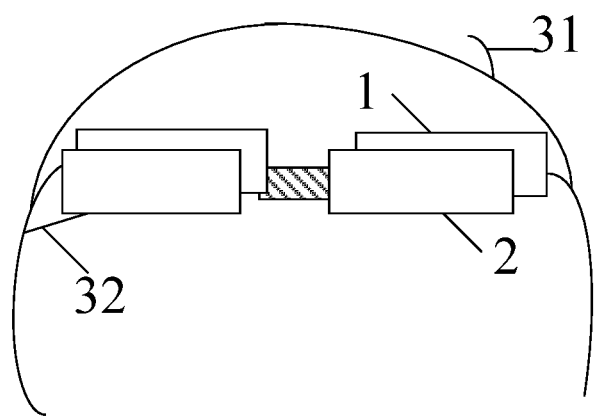
FIG. 8 is a schematic diagram of a display device provided by an embodiment of the present invention, which is a head-mounted display device.

When the display device provided by the embodiment of the present invention is a head-mounted display device (e.g., a head-mounted VR device), as shown in FIG. 8, the head-mounted display device comprises a display assembly 1 and a refractive component 2 disposed on a display side of the display assembly 1. In the head-mounted display device, in order to prevent structures, such as circuits and light sources, in the display assembly 1 from shielding light from outside scenes, the structures, such as the circuits and the light sources of the display assembly 1, are usually disposed at edges of the display assembly 1; the central part of the display assembly 1 is generally a light guide structure, and in the process of using the head-mounted display device, the light guide structure is configured to project light, projected by the light sources disposed at the edges, towards the direction of the glasses of a user, so that the user can view the images displayed by the display assembly 1. For instance, as shown in FIG. 8, the head-mounted display device may also include an eye detecting unit 31 and/or a brain wave detecting unit 32, or similar detecting devices. The diopter of the refractive component 2 can be automatically adjusted according to signals detected by the detecting component.

At least one embodiment of the present invention also provides a display method. Taking the display device as shown in FIG. 1 as an example, the display method comprises: emitting imaging light from the display region of the display assembly 1 to a default direction; and diverging or converging at least partial imaging light through the refractive component 2, in which the refractive component 2 is disposed on a display side of the display assembly 1.

For instance, the method provided by at least one embodiment of the present invention may also include: adjusting the divergence or convergence degree of the imaging light.

For instance, the divergence, or convergence degree of the imaging light may be adjusted by changing the focal length of the refractive component 2, namely the divergence, or convergence degree of the refractive component 2 to the imaging light is adjusted by changing the diopter of the refractive component 2. The adjustment mode may refer to the description with reference to FIGS. 3a to 4 in the embodiments of the display device.

For instance, the divergence, or convergence degree of the imaging light may also be adjusted by changing the distance between the refractive component 2 and the display assembly 1. The adjustment mode may refer to the description with reference to FIG. 5 in the embodiments of the display device.

For instance, the method provided by at least one embodiment of the present invention may also include: acquiring viewing information of a user, in which the viewing information of the user includes eye information, or brain wave information of the user; and adjusting the divergence, or convergence degree of the imaging light according to the viewing information. In this way, the divergence, or convergence of the imaging light can be automatically adjusted.

For instance, eye signals of the user may be acquired by the eye detecting unit, and brain wave information of the user may be acquired by the brain wave detecting unit.

The automatic adjustment process may refer to relevant description in the embodiments of the display device. No further description will be given here.

Several points below to be noted:

(1) The drawings of the embodiments of the present disclosure may only involve structures to which the embodiments of the present disclosure relate, and other structures can refer to general design;

(2) The thicknesses of the layers, or regions in the drawings do not reflect true scales, instead, they may be enlarged to some extent; and (3) Without conflict to each other, the embodiments of the present disclosures and features in the embodiments can be combined.

The foregoing is only the exemplary embodiments of the present disclosure and not intended to limit the scope of the present disclosure. The scope of the present disclosure is defined by the appended claims.

What is claimed is:

1. A display device, comprising:
   a display assembly including a display region and being configured to emit imaging light from the display region to a default direction;
   a refractive component comprising a first lens, a second lens and a third lens sequentially arranged along a propagation direction of the imaging light and spaced apart from each other on a display side of the display assembly and configured to diverge or converge at least partial imaging light;
   a refractive unit configured to diverge or converge the at least partial imaging light; and a distance adjustment structure configured to change a distance between the refractive unit and the display region of the display assembly; and
   a detecting component in signal communication with the refractive component, wherein the refractive component is configured to adjust the divergence or convergence degree of the at least partial imaging light according to signals transmitted by the detecting component;
   wherein both the first lens and the second lens are convex lenses, and the third lens is a concave lens, and the three lenses are liquid crystal lenses; and the detecting component comprises an eye detecting unit configured to acquire eye information of the user, and a brain wave detecting unit configured to acquire brain wave information of the user.

2. The display device according to claim 1, wherein the refractive component further comprises:
   an adjustment structure connected with the first lens and the second lens and configured to adjust a spacing between the first lens and the second lens.

3. The display device according to claim 1, wherein the third lens is disposed on a side of the second lens away from the first lens.

4. The display device according to claim 1, wherein the liquid crystal lens comprises a first substrate and a second substrate arranged oppositely to each other, and a first electrode, a second electrode and a liquid crystal layer disposed between the first substrate and the second substrate; the first electrode and the second electrode are spaced apart from each other; and at least one of the first electrode or the second electrode includes a plurality of sub-electrodes spaced apart from each other.

5. The display device according to claim 4, wherein the second substrate is disposed between the first substrate and the display assembly; and
   the second substrate is a polarizer, or the liquid crystal lens includes a polarizer disposed between the second substrate and the display assembly;
   wherein the liquid crystal lens and the display assembly share the polarizer.

6. The display device according to claim 5, wherein the display assembly comprises a third substrate and a fourth substrate arranged oppositely to each other, and a liquid crystal layer disposed between the third substrate and the fourth substrate; and the third substrate is disposed between the polarizer and the fourth substrate.

7. The display device according to claim 1, wherein the liquid crystal lens comprises a drive unit which is configured to apply a voltage to the liquid crystal lens to change the diopter of the liquid crystal lens.

8. The display device according to claim 7, wherein the liquid crystal lens and the display assembly share the drive unit.

9. The display device according to claim 1, wherein the display device is a head-mounted display device, or a non-head-mounted display device.

10. A display method, comprising:
   emitting imaging light from a display region of a display assembly to a default direction;
   diverging or converging at least partial imaging light through a refractive component, in which the refractive component is disposed on a display side of the display assembly, wherein the refractive component comprises a first lens, a second lens and a third lens sequentially arranged along a propagation direction of the imaging light and spaced apart from each other;
   adjusting a spacing respectively between the first lens, the second lens, and the third lens to adjust a diopter of the refractive component;
   adjusting the divergence or convergence degree of the imaging light by changing a distance between the refractive component and the display assembly; or adjusting the divergence or convergence degree by changing the focal length of the refractive component;
   acquiring viewing information of a user, in which the viewing informtation of the user includes eye information or brain wave information of the user; and
   adjusting the divergence or convergence degree according to the viewing information;
   wherein both the first lens and the second lens are convex lenses, and the third lens is a concave lens, and the three lenses are liquid crystal lenses.

* * * * *